(12) United States Patent
Anzivino et al.

(10) Patent No.: US 8,668,209 B1
(45) Date of Patent: Mar. 11, 2014

(54) PORTABLE MODULAR TOOL CABINET SYSTEMS

(76) Inventors: Mary Sue Anzivino, Glendale, AZ (US); Jaime Lynn Anzivino, Glendale, AZ (US)

( * ) Notice: Subject to any disclaimer, the term of this patent is extended or adjusted under 35 U.S.C. 154(b) by 83 days.

(21) Appl. No.: 13/544,837

(22) Filed: Jul. 9, 2012

Related U.S. Application Data (60) Provisional application No. 61/575,267, filed on Aug. 18, 2011.

(51) Int. Cl.
*B62B 1/08* (2006.01)
*B62B 1/00* (2006.01)

(52) U.S. Cl.
CPC ..................... *B62B 1/002* (2013.01)
USPC ............... 280/47.12; 280/47.16; 280/47.19; 280/47.2

(58) Field of Classification Search
CPC ........ B62B 1/002; B62B 1/08; B62B 2301/08
USPC ............... 280/35, 47.131, 47.12, 47.16, 47.2, 280/47.34, 79.2
See application file for complete search history.

(56) References Cited

U.S. PATENT DOCUMENTS

| | | | | |
|---|---|---|---|---|
| 1,496,216 A | * | 6/1924 | Groth | 312/305 |
| 2,710,759 A | * | 6/1955 | Bayer et al. | 280/47.33 |
| 2,905,480 A | * | 9/1959 | Giovannelli | 280/659 |
| 3,089,745 A | * | 5/1963 | Postula et al. | 312/324 |
| 3,220,790 A | * | 11/1965 | White | 312/240 |
| 3,704,799 A | * | 12/1972 | Morris, Jr. | 414/444 |
| 4,976,450 A | * | 12/1990 | Ellefson | 280/79.11 |
| 4,989,291 A | * | 2/1991 | Parent | 15/315 |
| 5,207,723 A | * | 5/1993 | Newby, Sr. | 312/249.11 |
| 5,213,351 A | * | 5/1993 | Chen | 280/47.19 |
| 5,224,531 A | * | 7/1993 | Blohm | 144/285 |
| 5,378,005 A | * | 1/1995 | Norton | 280/47.26 |
| 5,452,908 A | * | 9/1995 | Bencic | 280/47.35 |
| 5,533,799 A | * | 7/1996 | Nickolaus, Jr. | 312/249.12 |
| 5,588,659 A | * | 12/1996 | Boes et al. | 280/47.19 |
| 5,634,649 A | * | 6/1997 | Breining et al. | 280/47.35 |
| 6,086,073 A | * | 7/2000 | Tisbo et al. | 280/47.26 |
| 6,135,583 A | * | 10/2000 | Simon et al. | 312/257.1 |
| 6,170,839 B1 | * | 1/2001 | Kizewski | 280/47.26 |
| 6,520,514 B2 | * | 2/2003 | Clegg | 280/47.26 |
| 6,523,583 B1 | * | 2/2003 | Ruiz | 144/285 |
| 6,561,528 B2 | * | 5/2003 | Bootsman | 280/47.26 |
| 6,578,938 B2 | * | 6/2003 | Norman et al. | 312/290 |
| 6,742,789 B1 | * | 6/2004 | Nowak | 280/47.26 |

(Continued)

*Primary Examiner* — Hau Phan
*Assistant Examiner* — Jacob Meyer
(74) *Attorney, Agent, or Firm* — RG Patent Consulting, LLC; Rachel Gilboy (57) ABSTRACT

An apparatus for organizing and storing tools, related work materials, and convenience items such as a music system with speakers, a radio, a digital CD-player, and a MP3 adapter, as well as a compact refrigerator and a water cooler in a tool cabinet that is modular and easily transportable between work sites. The portable modular tool cabinet provides an electrical power system, shelving units and sliding drawers for holding tools and two lockable doors that hold additional hand tools and can be secured when the user is ready to transport the portable modular tool cabinet to another work site. The entire unit is transportable by using two base wheels and a pivotable-dolly-system with telescoping rod and wheel combinations that allow easy rolling to a transport vehicle such as a pickup truck for loading and transporting to another location.

19 Claims, 5 Drawing Sheets

(56) References Cited

U.S. PATENT DOCUMENTS

| | | | | |
|---|---|---|---|---|
| 6,926,160 B2 * | 8/2005 | Perkins et al. | | 211/94.01 |
| 6,926,376 B2 * | 8/2005 | Arent et al. | | 312/249.9 |
| 6,935,641 B2 * | 8/2005 | Hahn | | 280/47.19 |
| 6,945,546 B2 * | 9/2005 | Guirlinger | | 280/47.19 |
| 6,971,654 B2 * | 12/2005 | Amsili | | 280/47.2 |
| 7,044,569 B1 * | 5/2006 | Relyea et al. | | 312/249.11 |
| 7,210,689 B2 * | 5/2007 | Guirlinger | | 280/47.19 |
| 7,278,644 B2 * | 10/2007 | Villarreal | | 280/47.26 |
| 7,328,905 B2 * | 2/2008 | Guirlinger | | 280/47.19 |
| 7,338,054 B2 * | 3/2008 | Pint | | 280/79.2 |
| 7,367,571 B1 * | 5/2008 | Nichols | | 280/47.18 |
| 7,503,569 B2 * | 3/2009 | Duvigneau | | 280/47.18 |
| 7,544,915 B2 * | 6/2009 | Hu | | 219/387 |
| 7,571,915 B1 * | 8/2009 | Simmons | | 280/47.26 |
| D611,268 S * | 3/2010 | Knight | | D6/436 |
| 7,712,752 B2 * | 5/2010 | Horning | | 280/47.19 |
| 7,726,719 B1 * | 6/2010 | Barron | | 296/37.6 |
| 7,784,885 B2 * | 8/2010 | Steiger et al. | | 312/107 |
| 7,784,887 B2 * | 8/2010 | Grela et al. | | 312/218 |
| 7,815,215 B1 * | 10/2010 | Lowe | | 280/639 |
| 7,845,653 B2 * | 12/2010 | Katz | | 280/47.34 |
| 7,883,096 B2 * | 2/2011 | Katz et al. | | 280/47.26 |
| 7,938,412 B2 * | 5/2011 | Katz | | 280/47.34 |
| 8,033,369 B2 * | 10/2011 | Sherrell et al. | | 190/18 A |
| 8,132,819 B2 * | 3/2012 | Landau et al. | | 280/47.26 |
| 8,157,337 B2 * | 4/2012 | Manalang et al. | | 312/249.8 |
| 8,210,548 B1 * | 7/2012 | Agyemang | | 280/47.35 |
| 8,281,967 B2 * | 10/2012 | Evans | | 224/404 |
| 2002/0130598 A1 * | 9/2002 | Schmidt | | 312/324 |
| 2005/0062238 A1 * | 3/2005 | Broadfield et al. | | 280/1 |
| 2005/0280228 A1 * | 12/2005 | Fernandes et al. | | 280/47.35 |
| 2006/0012139 A1 * | 1/2006 | Guirlinger | | 280/35 |
| 2006/0043687 A1 * | 3/2006 | Downs | | 280/47.34 |
| 2006/0228201 A1 * | 10/2006 | Lenceski | | 414/466 |

* cited by examiner

PORTABLE MODULAR TOOL CABINET SYSTEMS

CROSS-REFERENCE TO RELATED APPLICATION

The present application is related to and claims priority from prior provisional application Ser. No. 61/575,267, filed Aug. 18, 2011 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of tool cabinets and more specifically relates to a portable modular tool cabinet system with wheels that can be transported to a worksite and removed from a transport device, such as a pick-up truck for user convenience.

2. DESCRIPTION OF THE RELATED ART

Most home improvement or repair jobs cannot be completed without the proper tools. In fact, it is not uncommon to find a fully stocked tool box or chest in garages, sheds and utility closets throughout America. Additionally, many pickup truck owners also install heavy-duty, aluminum tool boxes in the bed of their truck, so that a needed tool is assessable. Truck bed toolboxes are typically built to contain an extensive variety of tools, so even professional tradesmen are more apt to equip a truck with a toolbox since it allows them to easily transport all necessary supplies and tools to any job site. These tool boxes are heavy and not readily movable from their initial location.

Yet, while such mobile means of managing tools proves invaluable for many truck bed toolboxes, there are significant drawbacks. Particularly, these receptacles are typically made with a wide open interior; as such, there are normally no separate compartments for different varieties of tools, and all the various sized pliers, wrenches, screwdrivers, and wire cutters, not to mention the tiny drill bits and screw tips are stored together creating a sea of clutter that can be difficult to manage. Since many of these truck bed toolboxes do not provide adequate compartments, it can become frustrating for a user to rummage through a vast array of tools to find the exact tool that is needed. Some truck owners purchase tool trays and dividers for their truck bed toolboxes and then face the added frustration of having to manipulate them in order to locate the specific tool they need at the moment. More often than not, a simple repair job can become a daunting and frustrating chore. Additionally, truck bed toolboxes may be permanently built into the body of the vehicle; as a result, workers often find themselves making repeated trips to the truck to retrieve tools as they are needed.

Various attempts have been made to solve the above-mentioned problems such as those found in U.S. Pat. No. 5,378,005 to Norton; U.S. Pat. No. 6,935,641 to Hahn; and U.S. Pat. No. 7,367,571 to Nichols. This prior art is representative of tool cabinets. None of the above inventions and patents, taken either singly or in combination, is seen to describe the invention as claimed.

Ideally, a portable modular tool cabinet system should provide storage for and transport tools in such a manner that a user can easily access each of the tools in a tool cabinet; the user able to relocate his inventory of tools from location to location and, yet, would operate reliably and be manufactured at a modest expense. Thus, a need exists for a reliable portable modular tool cabinet system to avoid the above-mentioned problems.

BRIEF SUMMARY OF THE INVENTION

In view of the foregoing disadvantages inherent in the known tool cabinet art, the present invention provides a novel portable modular tool cabinet system. The general purpose of the present invention, which will be described subsequently in greater detail, is to provide a modular tool cabinet to organize and store tools and related work materials in a manner to easily locate a given tool or work material, and that such tools can be efficiently transported between work sites.

A portable modular tool cabinet system is disclosed in a preferred embodiment comprising; a modular tool cabinet assembly which comprises in combination a housing enclosure to provide the overall structure for the interior of the portable modular tool cabinet assembly, a compartmentalized framework comprising a plurality of removable dividers defining a plurality of inner volumes (as shelving), sliding drawers on rails for easy opening and closing, two doors that can be used to (vertically and/or horizontally) store tools and be secured when the portable modular tool cabinet is moved from location to location (or when access is desired as restricted), two base-wheels to provide a rolling motion when the portable modular tool cabinet system is being moved, a pivotable-dolly-system to further aid the relocation process and an electrical power system to gain access to an electric source, and thus provide electricity to power tools and ancillary items included in the portable modular tool cabinet system such as a music-system or refrigerator.

The removable dividers comprise modular shelving and shelving supports such that the compartmentalized framework can be user defined. Removable dividers also preferably comprise an L-shape profile acting as a stop to prevent tools from accidently egressing (sliding or the like) from confines of the housing enclosure. The modular system provides that the present invention is able to realize many configurations that may be suitable for many different work applications.

The compartmentalized framework comprises a plurality of sliding drawers defining accessible storage-volumes useful for (interiorly) storing tools and related work materials. Sliding drawers comprise handles which are useful for a user to manipulate sliding drawers on rails allowing sliding drawers to be easily opened and closed to access and return tools, respectively. Compartmentalized framework further comprises a left-hand-door and right-hand-door in preferred embodiments although single or multiple doors may be used in alternate embodiments. Left-hand-door and right-handdoor comprise apertured-shelves for vertically suspending hand-tools; apertured-shelves also preferably containing foam inserts in apertures to cushion-retain hand-tools and to prevent vibration. Foam may be located on the back of the doors to prevent vibration and to prevent impact damage. Left-hand-door swings on a left-hand-axis and right-hand-door swings on a right-hand-axis such that when doors are closed, entry into housing enclosure is restricted. Left-hand-door and right-hand-door are substantially planer when closed to create a flat front-face surface. An edge of left-hand-door overlaps a lip on right-hand-door and a locking-mechanism is used whereby tools contained within housing enclosure are suitably secured. The feature that the doors are planar when closed permits for example drywall sheets to be set on top of the present invention when sitting 'backdown' in a truck.

The present invention further comprises two base-wheels and a pivotable-dolly-system which are useable in conjunction to move portable modular tool cabinet system between locations. Pivotable-dolly-system comprises a left-hand-telescoping rod and wheel combination and a right-hand-telescoping rod and wheel combination which are pivotably connected to the housing enclosure such that the pivotable-dolly-system serves as a fulcrum when left-hand-telescoping rod and wheel combination and right-hand-telescoping rod and wheel combination contact a planar surface, allowing modular tool cabinet assembly to be rotated for loading, unloading and otherwise manipulating by a user.

Left-hand-telescoping rod and wheel combination and right-hand-telescoping rod and wheel combination each preferably comprise a leg-lock to secure left-hand-telescoping rod and wheel combination and right-hand-telescoping rod wheel combination when used to move the portable modular tool cabinet system. Left-hand-telescoping rod and wheel combination and right-hand-telescoping rod and wheel combination further comprises leg-stow-mechanisms each serving to retain left-hand-telescoping rod and wheel combination and right-hand-telescoping rod and wheel combination adjacent housing enclosure when not in use. Housing enclosure comprises reinforcement at attachment points for left-hand-telescoping rod and wheel combination and right-hand-telescoping rod and wheel combination. Further, a left-hand-ramp-sleeve and a right-hand-ramp-sleeve is provided for storing a left-hand-ramp and a right-hand-ramp, respectively.

Portable modular tool cabinet system also comprises an electrical power system including a power cord to access electricity at a work site to provide power to modular tool cabinet assembly, at least one light to provide illumination, at least one electrical-receptacle to provide power to power tools, and an attached pullout-electrical-extension-cord to accommodate additional electrical needs. Portable modular tool cabinet system further comprises a music-system comprising a speaker-assembly, radio, a CD-digital-music-player, and an MP3 adapter in preferred embodiments. Modular tool cabinet assembly may also comprise a compact-refrigerator and an insertable water-jug-cooler.

The present invention holds significant improvements and serves as a portable modular tool cabinet system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, portable modular tool cabinet system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a tool cabinet device and more particularly to a portable modular tool cabinet system designed to store tools in an organized manner and yet be easily transportable.

Generally speaking, the portable modular cabinet system provides an apparatus and system for organizing and storing tools (hand tools and power tools) and related work materials in user designated drawers or on user designated shelves. The portable modular cabinet system also provides an electrical system utilizing a power cord to receive electricity from an available power outlet at the work site and make the electricity available to other features of the portable modular cabinet system, such as a light, an outlet receptacle, power tools, an extension cord, a music-system and a refrigerator.

A further enhancement of the portable modular cabinet system is its ability to be closed and secured by a locking mechanism on two doors which also hold hand tools, and then loaded onto a transport vehicle, such as a pickup truck, by using its novel features of base wheels, and its pivotable-dolly-system of left-hand and right-hand telescoping rod and wheel combinations. The portable modular cabinet system can then be transported to a remote work location and unloaded for work at that location and later returned to its home base. In use the present invention provides many conveniences as will be discussed subsequently.

Figure 1:
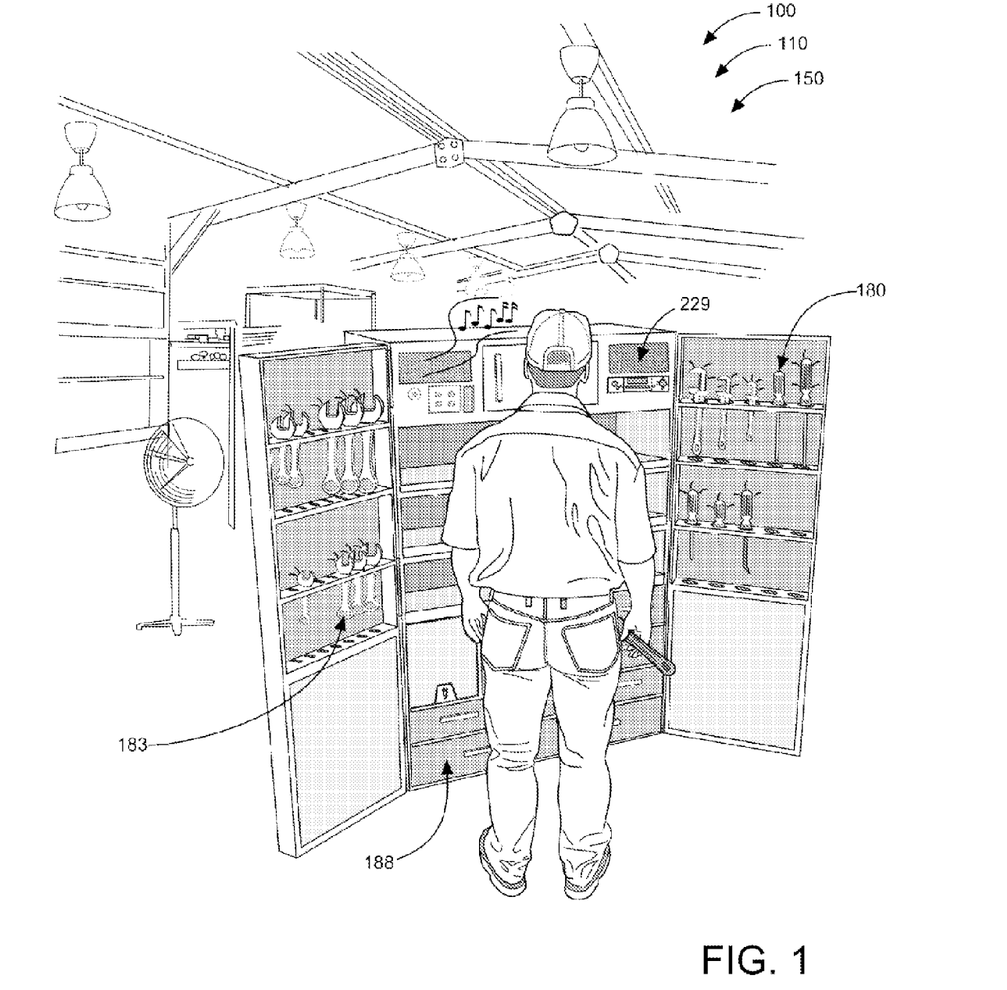
FIG. 1 shows a perspective view illustrating a portable modular tool cabinet system in an in-use condition according to an embodiment of the present invention.

Referring now to the drawings by numerals of reference there is shown in FIG. 1, a perspective view illustrating portable modular tool cabinet system 100 in an in-use condition 150 according to an embodiment of the present invention.

Figures 4A, 4B, 4C:
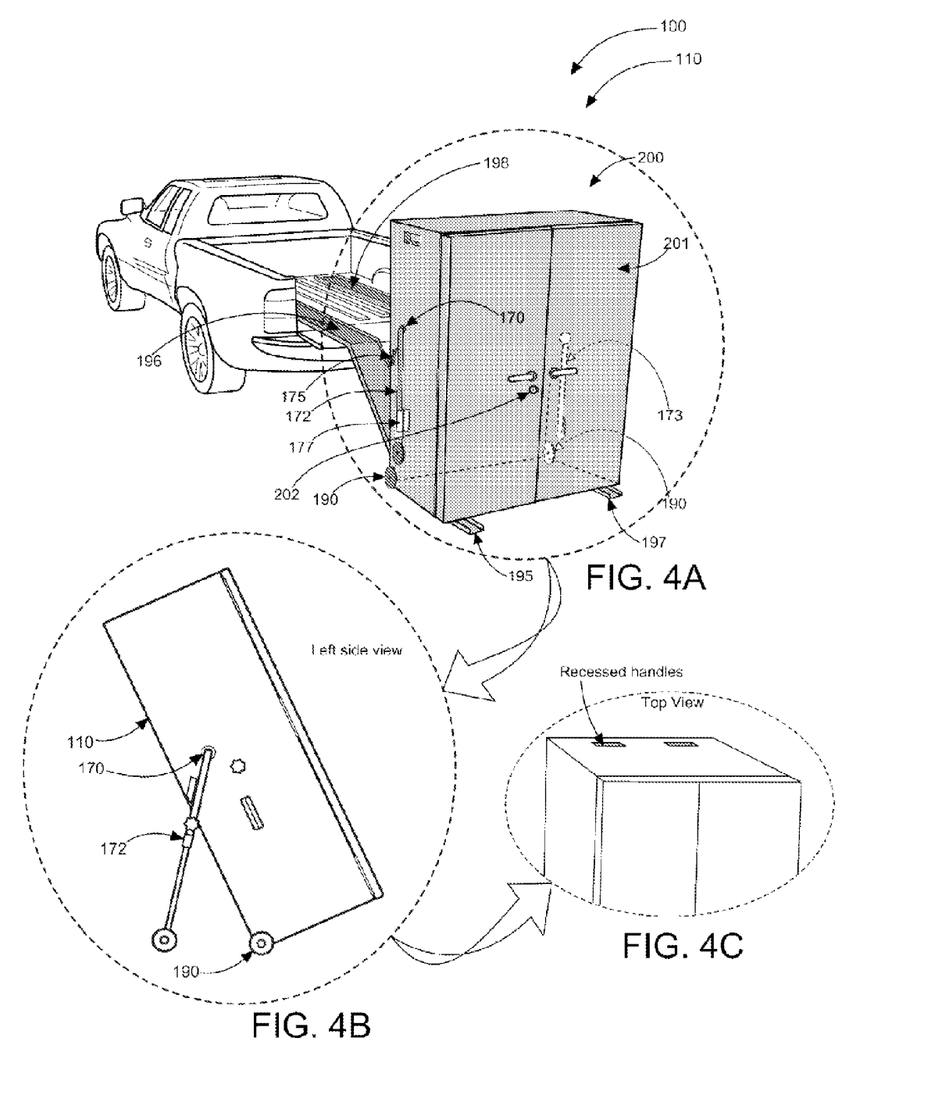
FIG. 4A is a perspective view illustrating the portable modular tool cabinet system ready to be loaded onto a transport vehicle according to an embodiment of the present invention of FIG. 1.
FIG. 4B is a perspective view illustrating a means of moving the portable modular tool cabinet system using base wheels and a pivotable-dolly-system according to an embodiment of the present invention of FIG. 1.
FIG. 4C is a top view illustrating the portable modular tool cabinet system according to an embodiment of the present invention of FIG. 1.

Portable modular tool cabinet system 100 comprises a modular tool cabinet assembly 110 which comprises in combination: a housing enclosure 120 to provide the overall structure for the interior of the portable modular tool cabinet assembly 110, a compartmentalized framework 125 comprising a plurality of removable dividers 130 (defining a plurality of inner volumes 133), sliding drawers 145 on rails 155 (tracks or the like) for storing various tools and work related materials, two doors 200 which can be closed and secured via a locking-mechanism 202, two base-wheels 190, a pivotable-dolly-system 170 providing an easy method of rolling portable modular tool cabinet system 100 to and from a transport vehicle, such as a pickup truck, and an electrical power system 175. FIG. 4A shows use of a truck to transport the present invention between locations.

Figure 2:
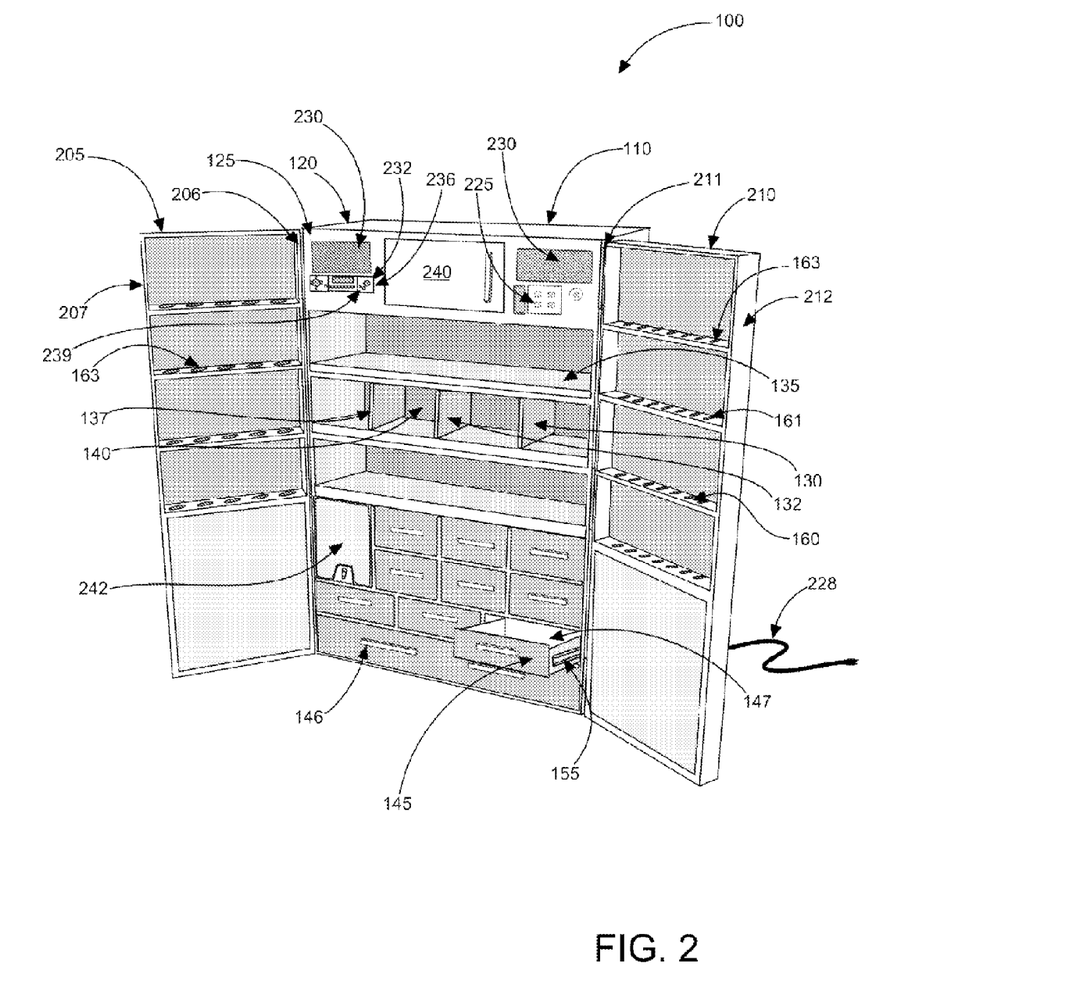
FIG. 2 is a perspective view illustrating a framework of the portable modular tool cabinet (system) according to an embodiment of the present invention of FIG. 1.

FIG. 2 is a perspective view illustrating the framework (compartmentalized framework 125) of portable modular tool cabinet system 100 according to an embodiment of the present invention of FIG. 1.

Compartmentalized framework 125 is comprises within confines of housing enclosure 120 comprising removable dividers 130 which further comprise modular shelving 135 and shelving supports 137 such that the compartmentalized framework 125 can be user defined. Removable dividers 130 further comprise an L-shape profile 132 acting as a stop to prevent tools 180 from accidently egressing from (sliding off) confines of housing enclosure 120 when portable modular tool cabinet system 100 is transported from location to location and when in use; this particular feature to promote safety. Compartmentalized framework 125 further comprises a plurality of sliding drawers 145 defining accessible storage-volumes 147 useful for storing tools 180 and related work materials 188. Sliding drawers 145 preferably comprise handles 146 which are useful for a user to open and close sliding drawers 145 on rails 155 allowing sliding drawers 145 to be easily opened and closed to access the user's tools 180. Sliding drawers 145 may hold tools 180 including hand-tools 183 and power tools 186 (pneumatic and the like may also be held) as well as related work materials 188.

Modular tool cabinet assembly 110 also comprises left-hand-door 205 and right-hand-door 210 in preferred embodiments. Left-hand-door 205 and right-hand-door 210 each may comprise apertured-shelves 160 for vertically suspending hand-tools 183; apertured-shelves 160 containing foam inserts 163 in apertures 161 to cushion-retain hand-tools 183 and to prevent vibration. Left-hand-door 205 swings on a left-hand-axis 206 and right-hand-door 210 swings on a right-hand-axis 211 such that when the two doors 200 are closed, entry into housing enclosure 120 is restricted so that theft of tools 180 is substantially prevented during non-use periods. Left-hand-door 205 and right-hand-door 210 are substantially planer when closed to create a flat front-face surface 201. An edge 207 of left-hand-door 205 overlaps a lip 212 on right-hand-door 210 and a locking-mechanism 202 is used whereby tools 180 contained within housing enclosure 120 are suitably secured.

Figure 3:
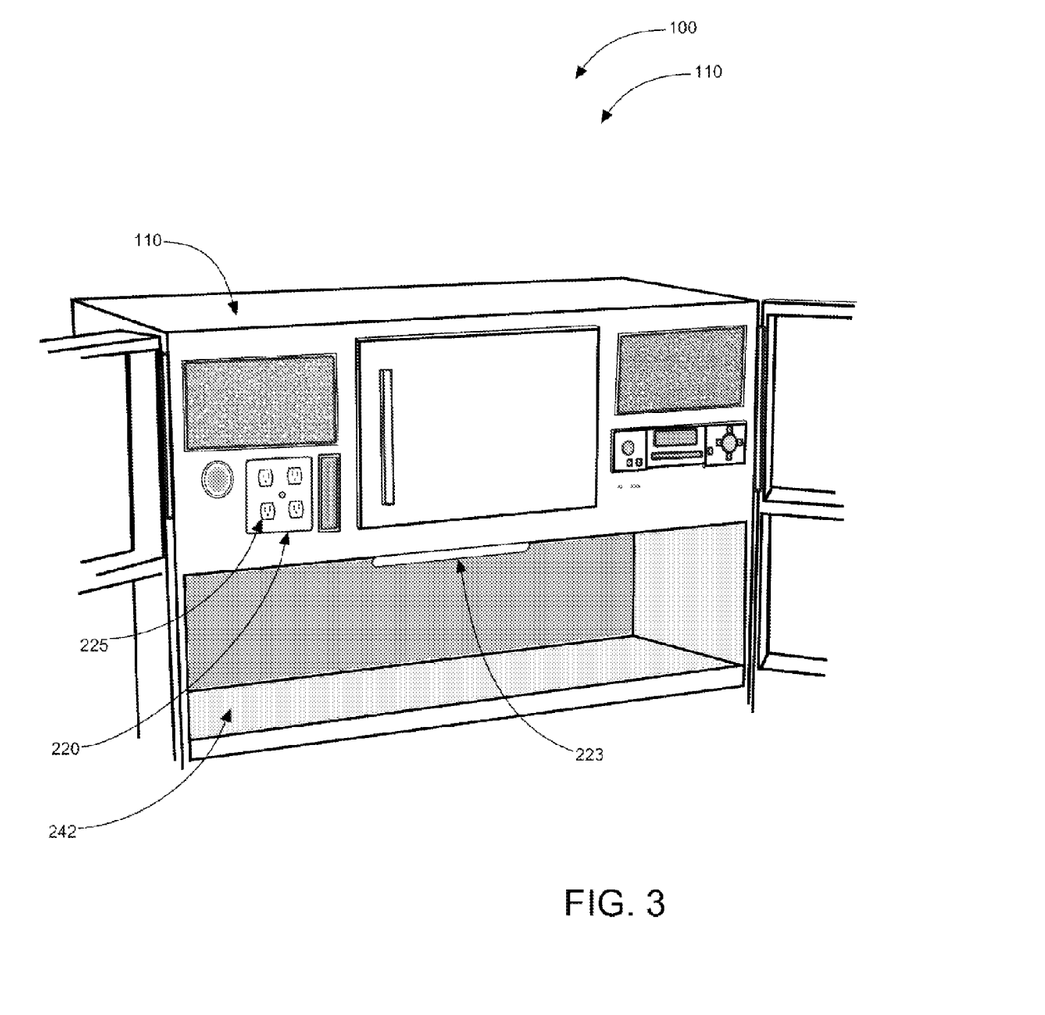
FIG. 3 is a perspective view illustrating an electrical system with associated convenience items such as a light, music-system, etc., according to an embodiment of the present invention of FIG. 1.

FIG. 3 is a perspective view illustrating electrical power system 220 according to an embodiment of the present invention of FIG. 1.

Electrical power system 220 comprises power cord 225 to access electricity at a work site to provide power to modular tool cabinet assembly 110, at least one electrical-receptacle 225 to provide electricity to power tools 186 (within a reasonable proximity to modular tool cabinet assembly 110), and an attached pullout-electrical-extension-cord 228 to accommodate additional electrical needs of the user. Electrical power system 220 further comprises a music-system 229 comprising a speaker-assembly 230, a radio 232, a CD-digital-music-player 236, and an MP3 adapter 239. Modular tool cabinet assembly 110 also comprises a compact-refrigerator 240 receiving power from electrical power system 220 and an insertable water-jug-cooler 242 in certain embodiments as also shown in FIG. 2.

FIG. 4A is a perspective view illustrating portable modular tool cabinet system 100 ready to be loaded onto a transport vehicle according to an embodiment of the present invention of FIG. 1.

Portable modular tool cabinet system 100 further comprises two base-wheels 190 and pivotable-dolly-system 170 which are useable in conjunction to move portable modular tool cabinet system 100 between locations. Pivotable-dolly-system 170 comprises a left-hand-telescoping rod and wheel combination 172 and a right-hand-telescoping rod and wheel combination 173 which are pivotably connected to housing enclosure 120 (shown in FIG. 4B) such that pivotable-dolly-system 170 serves as a fulcrum when left-hand-telescoping rod and wheel combination 172 and right-hand-telescoping rod and wheel combination 173 contact a planar surface, allowing modular tool cabinet assembly 110 to be rotated for loading, unloading and otherwise manipulating by a user.

Left-hand-telescoping rod and wheel combination 172 and right-hand-telescoping rod and wheel combination 173 each comprise at least one leg-lock 175 to secure left-hand-telescoping rod and wheel combination 172 and right-hand-telescoping rod wheel combination 173 when used to move portable modular tool cabinet system 100. Left-hand-telescoping rod and wheel combination 172 and right-hand-telescoping rod and wheel combination 173 further comprises leg-stow-mechanisms 177 each serving to retain left-hand-telescoping rod and wheel combination 172 and right-hand-telescoping rod and wheel combination 173 adjacent housing enclosure 120 when not in use. Further, a left-hand-ramp-sleeve and a right-hand-ramp-sleeve may be provided for storing a left-hand-ramp 196 and a right-hand-ramp 198, respectively, as shown in FIG. 3. FIG. 4B is a side perspective view illustrating moving portable modular tool cabinet system 100 using base wheels 190 and pivotable-dolly-system 170 according to an embodiment of the present invention of FIG. 1. Base wheels 190 do not change in relationship to housing enclosure 120; however pivotable-dolly-system 170 rotates and acts as a fulcrum to efficiently move modular tool cabinet assembly 110 and may be stowed between uses so they are not an obstacle for the user(s).

Portable modular tool cabinet system 100 may be sold as kit 440 comprising the following parts: at least one modular tool cabinet assembly 110 including sliding drawers 145 rails 155, modular shelving 135 and shelving supports 137; at least one pivotable-dolly-system 170 including left-hand and right-hand telescoping rod and wheel combinations 172 and 173, leg-lock 175, and leg-stow-mechanisms 177; at least one music system 229, including speaker-assembly 230, radio 232, CD-digital-music-player 236, compact-refrigerator 240, at least one (insertable) water-jug-cooler 242; and at least one set of user instructions. Portable modular tool cabinet system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different shelving/electrical combinations, parts may be sold separately, etc., may be sufficient.

Figure 5:
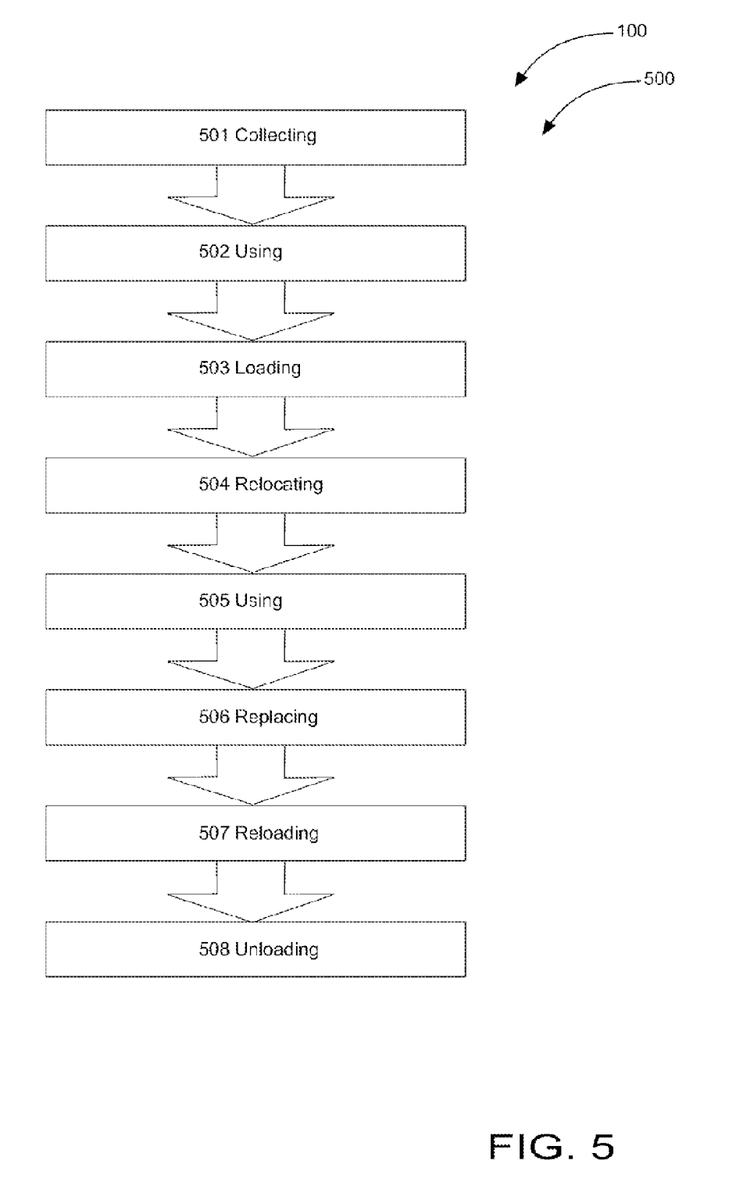
FIG. 5 is a flowchart illustrating a method of use of the portable modular tool cabinet system according to an embodiment of the present invention of FIGS. 1-4B.

FIG. 5 is a flowchart illustrating a method of use 500 of portable modular tool cabinet system 100 according to an embodiment of the present invention of FIGS. 1-4B.

A method of use 500 for portable modular tool cabinet system 100 may comprise the steps of: step one 501 collecting tools 180 to be added to portable modular tool cabinet system 100; step two 502 using tools 180 at user's home location; step three 503 loading portable modular tool cabinet system 100 onto transport vehicle; step four 504 relocating portable modular tool cabinet system 100 to remote location work site; step five 505 using tools 180 at remote location work site; 506 replacing tools 180 into portable modular tool cabinet system 100; step 507 reloading portable modular tool cabinet system 100 onto transport vehicle; and step 508 unloading portable modular tool cabinet system 100 at home location.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A portable modular tool cabinet system comprising:
a modular tool cabinet assembly including;
  a housing enclosure;
  a compartmentalized framework comprising;
    a plurality of removable dividers defining a plurality of inner-volumes;
  a plurality of sliding drawers defining storage-volumes, said sliding drawers comprising handles;
  at least one door;
  two base-wheels;
  a pivotable-dolly-system comprising;
    a left-hand-telescoping rod and wheel combination;
    a right-hand-telescoping rod and wheel combination; and
  an electrical power system to access electricity at a work site, said electrical power system comprising a power cord;
wherein said modular tool cabinet assembly comprises in combination said housing enclosure, said compartmentalized framework, said removable dividers, said sliding drawers, said door(s), two base-wheels, said pivotable-dolly-system, and said electrical power system;
wherein said two base-wheels and said pivotable-dolly-system are useable in conjunction to move said portable modular tool cabinet system between locations;
wherein said left-hand-telescoping rod and wheel combination and said right-hand-telescoping rod and wheel combination of said pivotable-dolly-system, are pivotably connected to said housing enclosure such that said pivotable-dolly-system serves as a fulcrum when said left-hand-telescoping rod and wheel combination and said right-hand-telescoping rod and wheel combination contact a planar surface, allowing said modular tool cabinet assembly to be rotated for loading, unloading and otherwise manipulating by a user;
wherein said inner-volumes and said storage-volumes are useful for storing tools and related work materials;
wherein said removable dividers are modular, such that said compartmentalized framework can be user-defined;
wherein said handles are useful for said user to open and close said sliding drawers;
wherein said power cord is used to provide power to said modular tool cabinet assembly; and
wherein said portable modular tool cabinet system provides storage of said tools and said related work materials, said portable modular tool cabinet system transportable to and from at least one said work site.

2. The portable modular tool cabinet system of claim 1 wherein said modular tool cabinet assembly comprises exactly two of said doors, wherein said doors comprise a left-hand-door which swings on a left-hand-axis and a right-hand-door which swings on a right-hand-axis such that when said doors are closed entry into said housing enclosure is restricted.

3. The portable modular tool cabinet system of claim 2 wherein said sliding drawers each comprise an accessible storage volume.

4. The portable modular tool cabinet system of claim 2 wherein said removable dividers comprise shelving and shelving supports.

5. The portable modular tool cabinet system of claim 2 wherein said removable dividers comprise an L-shape profile, said L-shape profile acting as a stop to prevent said tools from accidently egressing from confines of said housing enclosure.

6. The portable modular tool cabinet system of claim 2 wherein said left-hand-door and said right-hand-door comprise apertured-shelves for vertically suspending hand-tools.

7. The portable modular tool cabinet system of claim 2 wherein an edge of said left-hand-door overlaps a lip on said right-hand-door.

8. The portable modular tool cabinet system of claim 2 wherein said left-hand-door and said right-hand-door comprise a locking-mechanism whereby said tools contained within said housing enclosure are suitably secured.

9. The portable modular tool cabinet system of claim 2 wherein said modular tool cabinet assembly comprises a music-system comprising a speaker-assembly, radio, and a CD-digital-music-player.

10. The portable modular tool cabinet system of claim 9 wherein said modular tool cabinet assembly comprises a compact-refrigerator.

11. The portable modular tool cabinet system of claim 10 wherein said modular tool cabinet assembly further comprises an insertable water-jug-cooler.

12. The portable modular tool cabinet system of claim 11 further comprising at least one light to provide illumination.

13. The portable modular tool cabinet system of claim 12 further comprising electrical-receptacles.

14. The portable modular tool cabinet system of claim 13 further comprising an attached pullout-electrical-extension-cord.

15. The portable modular tool cabinet system of claim 14 further comprising rails allowing said sliding drawers to be opened and closed to access said tools.

16. The portable modular tool cabinet system of claim 1 further comprising a left-hand-ramp-sleeve and a right-hand-ramp-sleeve for storing a left-hand-ramp and a right-hand-ramp, respectively.

17. The portable modular tool cabinet system of claim 1 wherein said left-hand-telescoping rod and wheel combination and said right-hand-telescoping rod and wheel combination each comprise a leg-lock to secure said right-hand-telescoping rod wheel combination and said left-hand-telescoping rod and wheel combination when used to move said portable modular tool cabinet system, said portable modular tool cabinet system further comprising two leg-stow-mechanisms each serving to retain said left-hand-telescoping rod and wheel combination and said right-hand-telescoping rod and wheel combination adjacent said housing enclosure when not in use.

18. A portable modular tool cabinet system comprising:
a modular tool cabinet assembly including;
   a housing enclosure;
   a compartmentalized framework comprising;
      a plurality of removable dividers defining a plurality of inner-volumes;
      a plurality of sliding drawers defining storage-volumes, said sliding drawers comprising handles;
      a plurality of rails allowing said sliding drawers to be opened and closed to access said tools;
   two doors;
   two base-wheels;
   a pivotable-dolly-system comprising;
      a left-hand-telescoping rod and wheel combination;
      a right-hand-telescoping rod and wheel combination;
   an electrical power system comprising;
      a power cord to access electricity at a work site;
      at least one light to provide illumination;
      at least one electrical-receptacle;
      an attached pullout-electrical-extension-cord; and
   a left-hand-ramp-sleeve and a right-hand-ramp-sleeve for storing a left-hand-ramp and a right-hand-ramp, respectively;
wherein said modular tool cabinet assembly comprises at least in combination said housing enclosure, said compartmentalized framework, said removable dividers, said sliding drawers, said door(s), two base-wheels, said pivotable-dolly-system, and said power cord;
wherein said doors comprise a left-hand-door which swings on a left-hand-axis and a right-hand-door which swings on a right-hand-axis such that when said doors are closed entry into said housing enclosure is restricted, said left-hand-door and said right-hand-door substantially planer when closed to create a flat front-face surface;
wherein said two base-wheels and said pivotable-dolly-system are useable in conjunction to move said portable modular tool cabinet system between locations;
wherein said left-hand-telescoping rod and wheel combination and said right-hand-telescoping rod and wheel combination of said pivotable-dolly-system, are pivotably connected to said housing enclosure such that said pivotable-dolly-system serves as a fulcrum when said left-hand-telescoping rod and wheel combination and said right-hand-telescoping rod and wheel combination contact a planar surface, allowing said modular tool cabinet assembly to be rotated for loading, unloading and otherwise manipulating by a user;
wherein said left-hand-telescoping rod and wheel combination and said right-hand-telescoping rod and wheel combination each comprise a leg-lock to secure said right-hand-telescoping rod wheel combination and said left-hand-telescoping rod and wheel combination when used to move said portable modular tool cabinet system, said portable modular tool cabinet system further comprising two leg-stow-mechanisms each serving to retain said left-hand-telescoping rod and wheel combination and said right-hand-telescoping rod and wheel combination adjacent said housing enclosure when not in use;
wherein said inner-volumes and said storage-volumes are useful for storing tools and related work materials;
wherein said removable dividers are modular, such that said compartmentalized framework can be user-defined;
wherein said removable dividers comprise shelving and shelving supports;
wherein said removable dividers comprise an L-shape profile, said L-shape profile acting as a stop to prevent said tools from accidently egressing from confines of said housing enclosure;
wherein said modular tool cabinet assembly further comprises a music-system comprising a speaker-assembly, radio, and CD-digital-music-player, and an MP3 adapter;
wherein said modular tool cabinet assembly comprises a compact-refrigerator;
wherein said modular tool cabinet assembly further comprises an insertable water-jug-cooler;
wherein said left-hand-door and said right-hand-door comprise a locking-mechanism whereby said tools contained within said housing enclosure are suitably secured;
wherein an edge of said left-hand-door overlaps a lip on said right-hand-door;
wherein said left-hand-door and said right-hand-door comprise apertured-shelves for vertically suspending hand-tools, said apertured-shelves containing foam inserts in apertures to cushion-retain said hand-tools and to prevent vibration;
wherein said handles are useful for said user to open and close said sliding drawers;
wherein said sliding drawers each comprise an accessible storage volume;
wherein said power cord is used to provide power to said modular tool cabinet assembly; and
wherein said portable modular tool cabinet system provides storage of said tools, said hand-tools, power-tools, and said related work materials, said portable modular tool cabinet system transportable to and from at least one said work site.

19. A method of use for the portable modular tool cabinet system of claim 1 comprising the steps of:
collecting tools to be added to said portable modular tool cabinet system
using said tools at a user's home location;
loading said portable modular tool cabinet system onto a transport vehicle;
relocating said portable modular tool cabinet system to a remote location work site;
using said tools at said remote location work site;

replacing said tools into said portable modular tool cabinet system reloading said portable modular tool cabinet system onto said transport vehicle unloading said portable modular tool cabinet system at said home location.

* * * * *